United States Patent [11] 3,588,127

[72] Inventor Edgar Padbury Coleman
 197 Tentelow Lane, Southall, England
[21] Appl. No. 708,712
[22] Filed Feb. 27, 1968
[45] Patented June 28, 1971
[32] Priority Feb. 28, 1967
[33] Great Britain
[31] 9400/67

[54] SEAL FOR RELATIVELY ROTATING MEMBERS
 5 Claims, 2 Drawing Figs.
[52] U.S. Cl. ................................................. 277/92
[51] Int. Cl. .............................................. F16j 15/54
[50] Field of Search ........................................ 277/92

[56] References Cited
 UNITED STATES PATENTS
2,373,443  4/1945  Armington ................... 277/92
2,713,504  7/1955  Coleman ...................... 277/43
2,994,547  8/1961  Dolhun et al. ................ 277/92X
3,031,199  4/1962  Laser et al. ................... 277/92X
3,372,940  3/1968  Keller .......................... 277/92
 FOREIGN PATENTS
655,392   1/1963  Canada ........................ 277/92
985,844   3/1965  Great Britain ................ 277/92

Primary Examiner—Laverne D. Geiger
Assistant Examiner—Robert I. Smith
Attorney—Watson, Cole, Grindle & Watson ABSTRACT: A device for making fluidtight joints between a relatively rotating shaft and casing as in U.S. Pat. No. 2,713,504 has the fluidtight connection between the fast member and the casing made by an L-section elastomeric cuff, the axial limb of which fills an annular space between an internal surface of the casing and an external surface of the fast member and the inwardly extending limb of which contacts an external surface within the casing and fills the space between the end of the fast member opposite to the rubbing surface and a transverse surface in the casing.

PATENTED JUN 28 1971 3,588,127

Inventor
Edgar Radbury Coleman
By
Watson, Cole, Grindle & Watson

SEAL FOR RELATIVELY ROTATING MEMBERS

This invention relates to devices for making fluidtight joints between two relatively rotating parts, namely a shaft and a casing or the like, comprising a first, fast member and a second, free member, accurately finished surfaces one on each of said members making rubbing contact with one another in a circle around the axis of the shaft, means resiliently urging said surfaces together, means making a fluidtight and fast connection between said first fast member and one of said parts, means including a flexible joint making a fluidtight connection between said free member and the other of said parts, and means keying said free members to said other parts.

A construction of such a device is disclosed in my prior U.S. Pat. No. 2,713,504 which has proved highly successful in practice. However, cases arise where the flexible flange by which the fast member of the rubbing joint was mounted in the construction of FIGS. 1 and 2 of that specification cannot be accommodated and the fast member has to be sealed inside a casing constituting a portion of one of the relatively rotating parts, relative rotation of the fast member and the casing being prevented by a ball lodged in longitudinal grooves in an internal sleeve or spigot integral with the casing and in the bore of the fast member. In such cases a fluidtight seal between the fast member and casing has been made by bonding or an O-ring as in FIGS. 3 and 4 of my U.S. Pat. No. 2,713,504 and in practice such bonding or an O-ring seal may sooner or later leak somewhat.

The present invention is a modification of the means making the fluidtight connection between the fast member and the casing which provides a better seal between the fast member and the casing. This seal takes the form of a substantially L-section cuff of fluid-resisting elastomer (rubber or synthetic material according to the fluid used), one limb of the L extending axially and filling an annular space between an internal peripheral surface in the one of said parts and an external peripheral surface of said first member and the other limb of the L extending inwards into contact with an external surface on the other of said parts and filling the space between the end of said fast member opposite to the rubbing surface thereof and a transverse surface in the one of said parts.

The invention will be further described with reference to the accompanying drawings which by way of example shows it embodied in a device used for making the fluidtight joint between the parts of a fluid coupling.

Figure 1:
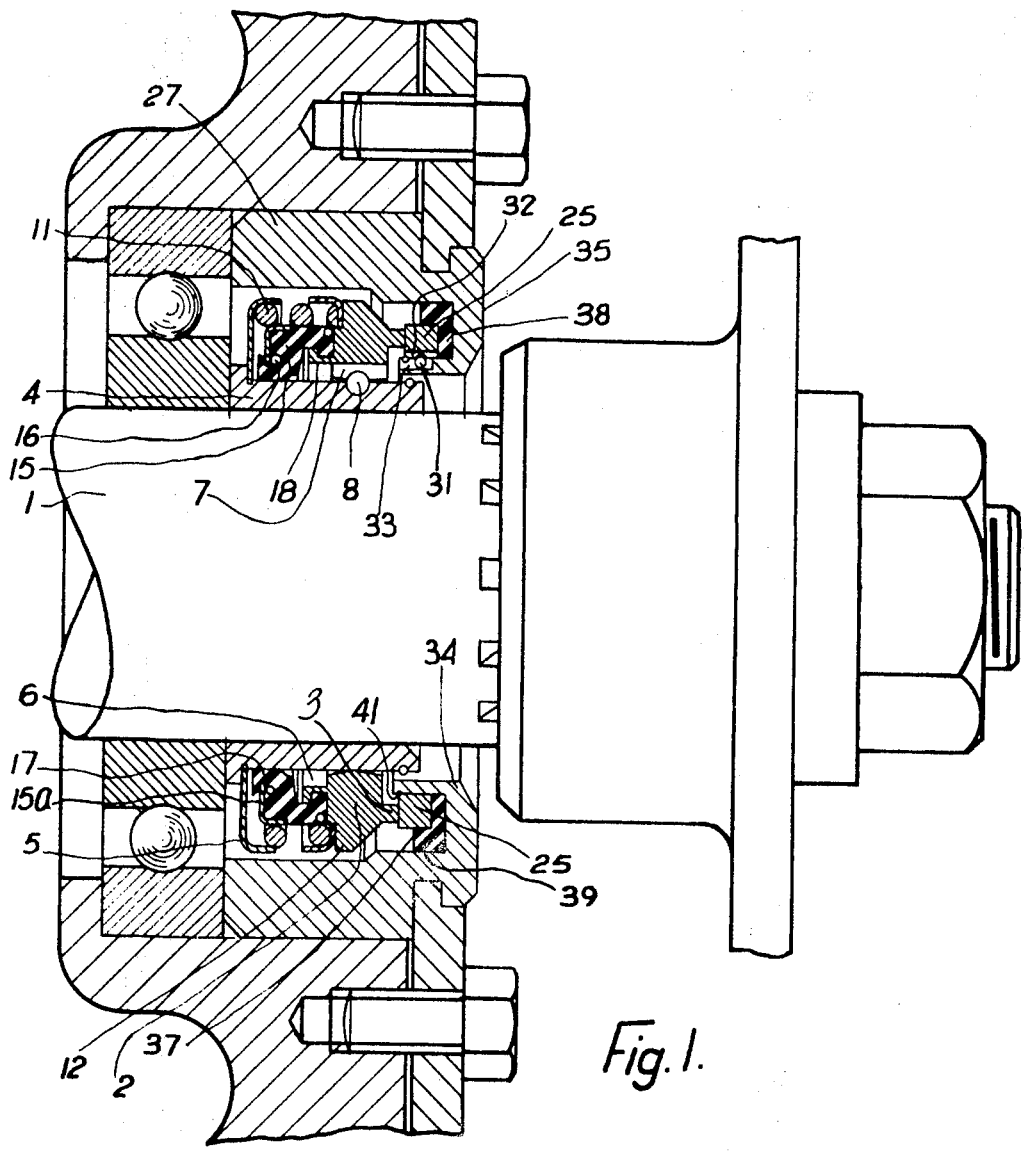
FIG. 1 is a longitudinal section of the device.

In the example illustrated, the rotating shaft 1 carries one of the two members which are to make rubbing contact, the free member in the form of a loose collar member 2, having an integral rib 3 bearing the actual accurately finished rubbing surface of the joint. This collar member 2 is keyed and sealed to a sleeve 4 itself mounted in fluidtight and driving engagement with the shaft 1, by ports comprising a flange 5, a keyway 6, a key 7, a steel ball 8, a helical spring 11, a shoulder 12 on collar 2, a rubber cuff 15 having in one end 16 thereof a spring ring 17 and a rib 18 all as in my aforesaid U.S. Pat. No. 2,713,504. The cuff 15 is however of thick section and provided with a metal shroud 15a, better to resist centrifugal force at high speeds.

Also as in FIG. 4 of that specification the other, the fast member of the two members which are to make rubbing contact takes the form of an annular ring 25 on the one end of which is formed the accurately finished rubbing surface coacting with that of the rib 3. This ring 25 is fast and sealed to a casing 27 itself being part of the fluidtight external casing of the fluid coupling.

The ring 25 is made and prevented from rotating in relation to the casing 27 by a ball 31 lodged in longitudinal grooves 32, 33 respectively in the ring 25 and in an internal sleeve 34 integral, through a transverse flange 35, with the casing 27. The bore of the ring 25 is a sliding fit on the sleeve 34 and this arrangement enables the ring and the cuff to be described to be mounted without hindrance.

The ring 25 is sealed in accordance with the invention to the casing 27 by an L-section cuff of fluid-resisting elastomer having an axial limb 37 and an inwardly extending limb 38.

The limb 37 fills an annular space between an internal cylindrical peripheral surface 39 in the casing 27 and the external cylindrical peripheral surface of the ring 25. The limb 38 extends inwardly into contact with the external surface of the sleeve 34 (which is integral with the casing 27 forming one of the relatively rotating parts of the device). The limb 38 also fills the space between the opposite end of the ring 25 opposite to the rubbing surface thereof and the internal transverse surface provided by the flange 35.

A wire circlip 41 lodged in a groove in the sleeve 34 is provided in this example to retain the parts assembled against accidental dislodgement without imposing any compression on the cuff in the axial direction.

Figure 2:
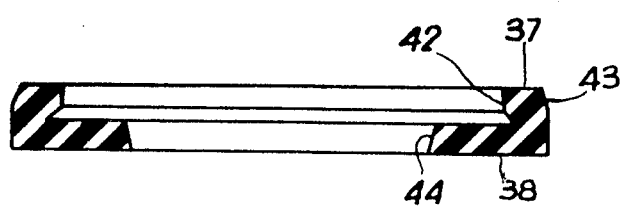
FIG. 2 is a section of the cuff when free.

Desirably the cuff when free does not match the space it is to fill but has the diameter of the internal surface of the axial limb 37 less at least at its outer end than the diameter of the external peripheral surface of the ring 25 so that when in place this limb is expanded by the ring, and it also has the bore of the inwardly extending limb 38 less at least at the end of the limb which abuts the transverse surface provided by the flange 35. In particular as shown in FIG. 2 the limb 37 is tapered both on its inner periphery as at 42 and its outer periphery as at 43, while the bore of the limb 38 is chamfered as at 44 with the smaller diameter end at the end of the limb which abuts the surface provided by the flange 35. These differences between the cross section of the cuff and that of the space which it fills ensure elastic displacement of the material of the cuff when the whole is assembled which improves the sealing pressure. At the same time the resilience of the cuff affords the ring 25 a slight degree of float which supplements the freedom of the ring 2 to adjust itself both axially and angularly.

I claim:

1. In a device for making a fluidtight joint between two relatively rotating parts, namely a shaft and a casing or the like, comprising a first, fast member and a second, free member, accurately finished surfaces one on each of said members making rubbing contact with one another in a circle around the axis of the shaft, means resiliently urging said surfaces together, means making a fluidtight and fast connection between said first fast member and one of said parts, means including a flexible joint making a fluidtight connection between said free member and the other of said parts, and means keying said free member to said other part, the improvement which consists in the means making the fluidtight connection between said first, fast member and said one of said parts being in the form of a substantially L-section cuff of fluid-resisting elastomer, one limb of the L-section extending axially and filling an annular space between an inwardly facing peripheral surface in said one of said parts and an external peripheral surface of said first, fast member and the other limb of the L extending inwardly into contact with an outwardly facing surface on said one of said parts and filling the space between the end of said first fast member opposite to the rubbing surface thereof and a transverse surface in said one of said parts.

2. A device according to claim 1 wherein said one of said parts is a casing having an inward flange extending radially towards the other of said parts, said flange providing said transverse surface.

3. A device according to claim 1 wherein the cuff when free does not match the space it is to fill, the diameter of the internal surface of the axial limb of said cuff being less than the diameter of said external peripheral surface of said first member, at least at the outer end thereof whereby when in place said axial limb is expanded by said first, fast member.

4. A device according to claim 1 wherein the cuff when free does not match the space it is to fill, the bore of the inwardly extending limb being less at least in part than the diameter of said external peripheral surface on the other of said parts.

5. A device according to claim 1 wherein the cuff when free does not match the space it is to fill, the axial limb thereof being tapered on its external and internal surfaces in proceeding away from the inwardly extending limb, and the bore of the inwardly extending limb being chamfered with the smaller diameter end at the end of the inwardly extending limb which abuts said transverse surface.